United States Patent
Pasqua et al.

(10) Patent No.: US 9,676,446 B2
(45) Date of Patent: Jun. 13, 2017

(54) BICYCLE DERAILLEUR GEAR, PARTICULARLY A FRONT DERAILLEUR GEAR, WITH IMPROVED RELIABILITY

(71) Applicant: Campagnolo S.r.l., Vicenza (IT)

(72) Inventors: Paolo Pasqua, Camisano Vicentino (IT); Alberto Bortoli, Altavilla Vicentina (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 14/191,524

(22) Filed: Feb. 27, 2014

(65) Prior Publication Data

US 2014/0243128 A1 Aug. 28, 2014

(30) Foreign Application Priority Data

Feb. 28, 2013 (IT) .............................. MI2013A0299

(51) Int. Cl.
*F16H 9/00* (2006.01)
*F16H 59/00* (2006.01)
(Continued)

(52) U.S. Cl.
CPC ............ *B62M 9/134* (2013.01); *B62M 9/132* (2013.01)

(58) Field of Classification Search
CPC ...... B62M 25/08; B62M 9/132; B62M 9/122; B62M 9/1244; F16H 63/30
(Continued)

(56) References Cited

U.S. PATENT DOCUMENTS 3,181,383 A * 5/1965 Juy .................................. 474/82
5,254,044 A * 10/1993 Anderson ....................... 474/70
(Continued)

FOREIGN PATENT DOCUMENTS

| DE | 3502774 A1 | 10/1986 |
|----|------------|---------|
| EP | 1103456 A2 | 5/2001  |
| EP | 1568596 A1 | 8/2005  |

OTHER PUBLICATIONS

Italian Search Report and Written Opinion in Italian Application No. IT MI2013A000299, Oct. 18, 2013 with English translation.

*Primary Examiner* — Henry Liu
(74) *Attorney, Agent, or Firm* — Volpe and Koenig, P.C.

(57) ABSTRACT

The present invention relates to a bicycle derailleur gear, particularly a front derailleur gear, with improved reliability that comprises a kinematic mechanism in the form of a four-bar linkage with a base body and a mobile body connected together through a pair of connecting rods hinged to the base body and to the mobile body at four pin elements, the mobile body carrying a chain guide, the four-bar linkage-kinematic mechanism being associated with derailleur gear actuation means suitable for deforming the four-bar linkage-kinematic mechanism so as to determine a displacement of the mobile body with respect to the base body and consequently a displacement of the chain guide, the derailleur gear actuation means being of the motorized type and comprising a motor casing and an outlet shaft that projects directly from said motor casing and characterized in that the actuation means command a translation in the axial direction of the outlet shaft with respect to the motor casing and are mounted between distinct components of the four-bar linkage-kinematic mechanism through interposition of at least one tilting interface about a fifth pin element substantially parallel to the pin elements.

11 Claims, 4 Drawing Sheets

(51) Int. Cl.
*F16H 61/00* (2006.01)
*F16H 63/00* (2006.01)
*B62M 9/134* (2010.01)
*B62M 9/132* (2010.01)

(58) Field of Classification Search
USPC .................................................. 474/80, 82
See application file for complete search history.

(56) References Cited

U.S. PATENT DOCUMENTS

| | | | |
|---|---|---|---|
| 6,648,782 B2 * | 11/2003 | Valle | 474/78 |
| 6,679,797 B2 * | 1/2004 | Valle | 474/80 |
| 6,979,009 B2 * | 12/2005 | Ichida et al. | 280/238 |
| 7,004,862 B2 * | 2/2006 | Fukuda | 474/102 |
| 7,255,660 B2 * | 8/2007 | Del Pra | 474/82 |
| 7,291,079 B2 * | 11/2007 | Ichida et al. | 474/80 |
| 7,306,531 B2 * | 12/2007 | Ichida et al. | 474/70 |
| 7,331,890 B2 * | 2/2008 | Ichida et al. | 474/80 |
| 7,341,532 B2 * | 3/2008 | Ichida et al. | 474/70 |
| 7,381,142 B2 * | 6/2008 | Campagnolo | 474/70 |
| 7,442,136 B2 * | 10/2008 | Ichida et al. | 474/82 |
| 7,467,567 B2 * | 12/2008 | Fukuda | 74/412 R |
| 7,503,863 B2 * | 3/2009 | Ichida et al. | 474/80 |
| 7,704,173 B2 * | 4/2010 | Ichida et al. | 474/82 |
| 8,002,655 B2 * | 8/2011 | Meggiolan | 474/82 |
| 8,033,937 B2 * | 10/2011 | Meggiolan | 474/70 |
| 8,066,597 B2 * | 11/2011 | Sakaue | 474/82 |
| RE43,562 E * | 7/2012 | Takeda et al. | 474/78 |
| 8,241,158 B2 * | 8/2012 | Ishikawa | 474/80 |
| 8,282,519 B2 * | 10/2012 | Ichida et al. | 474/82 |
| 8,979,683 B2 * | 3/2015 | Katsura et al. | 474/80 |
| 2002/0061797 A1 * | 5/2002 | Valle | 474/70 |
| 2003/0027674 A1 * | 2/2003 | Valle | 474/70 |
| 2004/0014541 A1 * | 1/2004 | Dal Pra | 474/70 |
| 2004/0063528 A1 * | 4/2004 | Campagnolo | 474/70 |
| 2004/0102268 A1 * | 5/2004 | Valle | 474/80 |
| 2005/0192137 A1 * | 9/2005 | Ichida et al. | 474/70 |
| 2005/0192139 A1 * | 9/2005 | Ichida et al. | 474/80 |
| 2005/0192140 A1 * | 9/2005 | Meggiolan | 474/80 |
| 2005/0197222 A1 * | 9/2005 | Tatsumi | 474/80 |
| 2005/0205323 A1 * | 9/2005 | Ichida et al. | 180/205 |
| 2005/0239587 A1 * | 10/2005 | Ichida et al. | 474/82 |
| 2005/0266945 A1 * | 12/2005 | Meggiolan | 474/70 |
| 2006/0189421 A1 * | 8/2006 | Ichida et al. | 474/80 |
| 2006/0189422 A1 * | 8/2006 | Ichida et al. | 474/80 |
| 2007/0037645 A1 * | 2/2007 | Ishikawa | 474/80 |
| 2007/0184925 A1 * | 8/2007 | Ichida et al. | 474/80 |
| 2008/0132364 A1 * | 6/2008 | Ichida et al. | 474/70 |
| 2014/0114538 A1 * | 4/2014 | Shipman et al. | 701/51 |
| 2014/0121047 A1 * | 5/2014 | Katsura et al. | 474/80 |
| 2014/0128189 A1 * | 5/2014 | Kuwayama et al. | 474/82 |
| 2014/0128190 A1 * | 5/2014 | Emura et al. | 474/80 |
| 2014/0148287 A1 * | 5/2014 | Tachibana et al. | 474/82 |
| 2014/0155205 A1 * | 6/2014 | Kuwayama et al. | 474/80 |
| 2014/0323254 A1 * | 10/2014 | Kuwayama et al. | 474/80 |

* cited by examiner

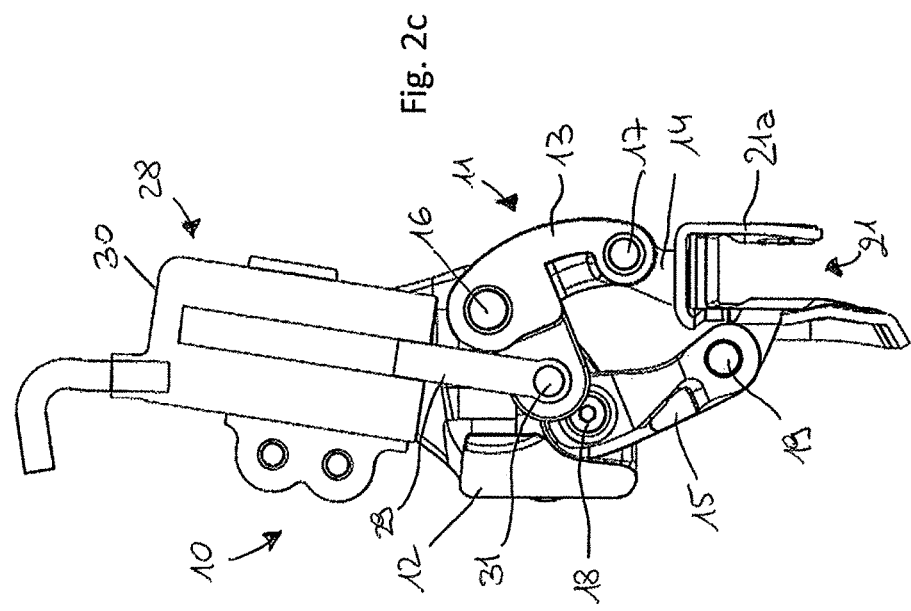
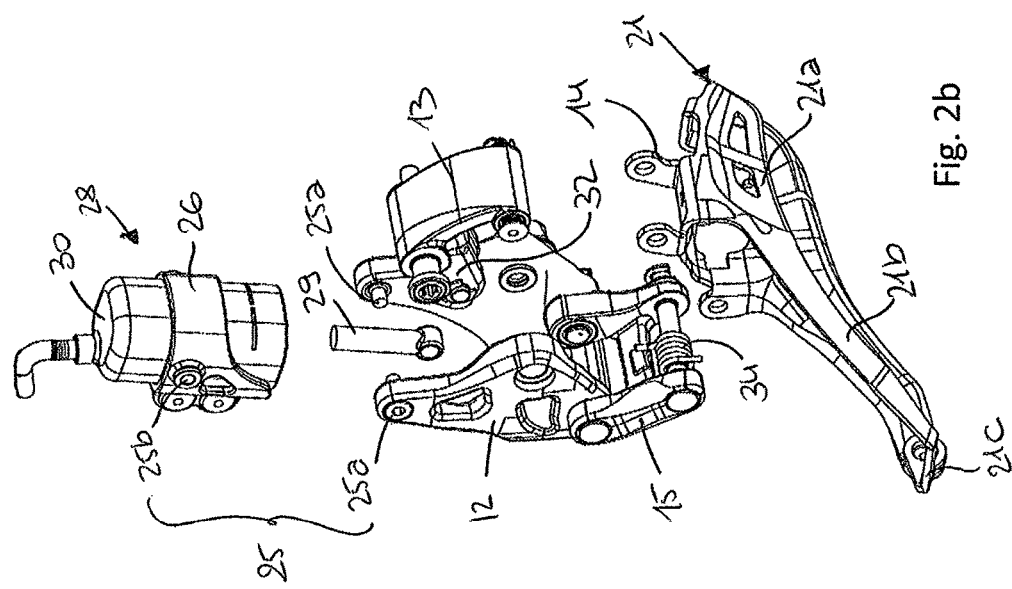

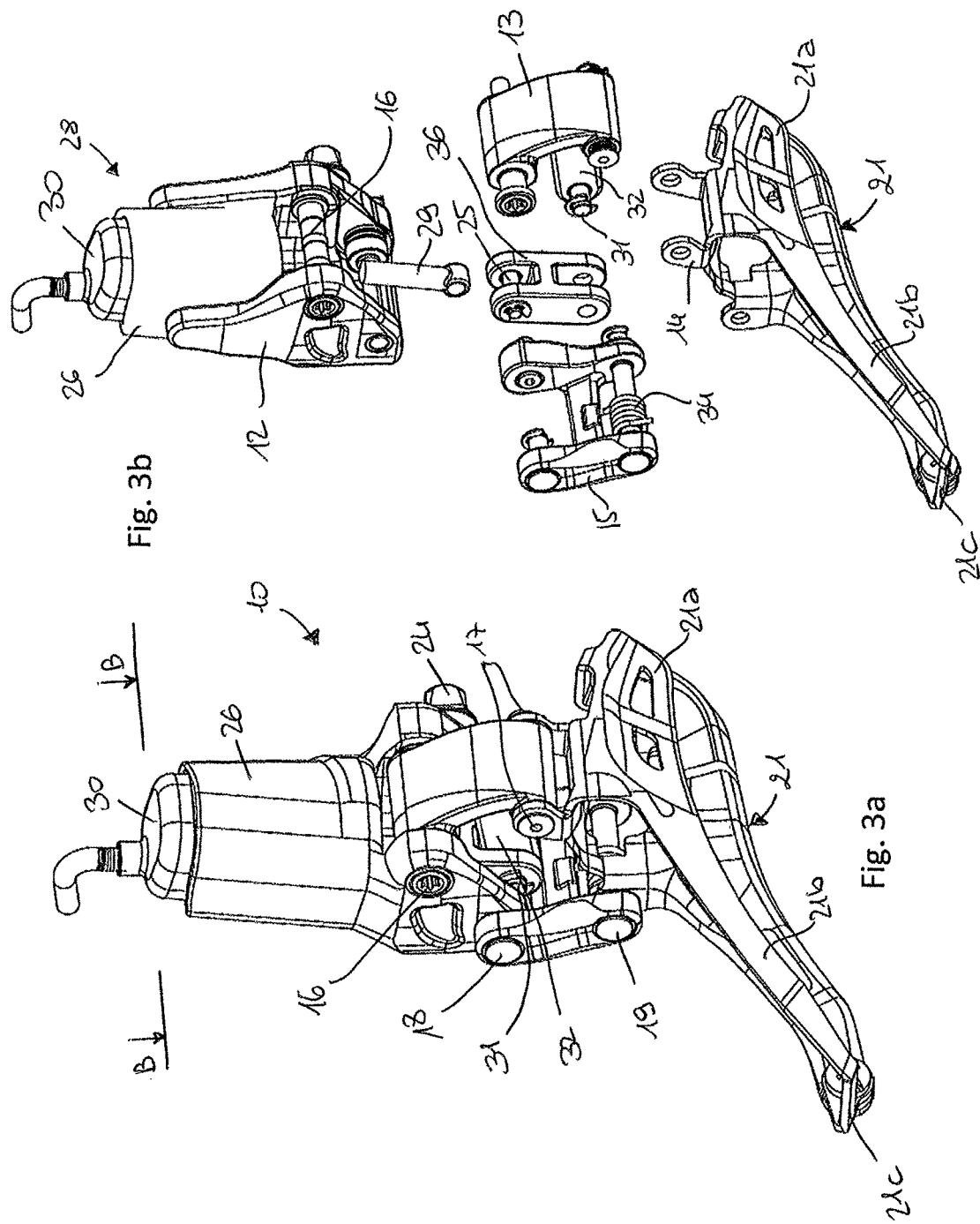

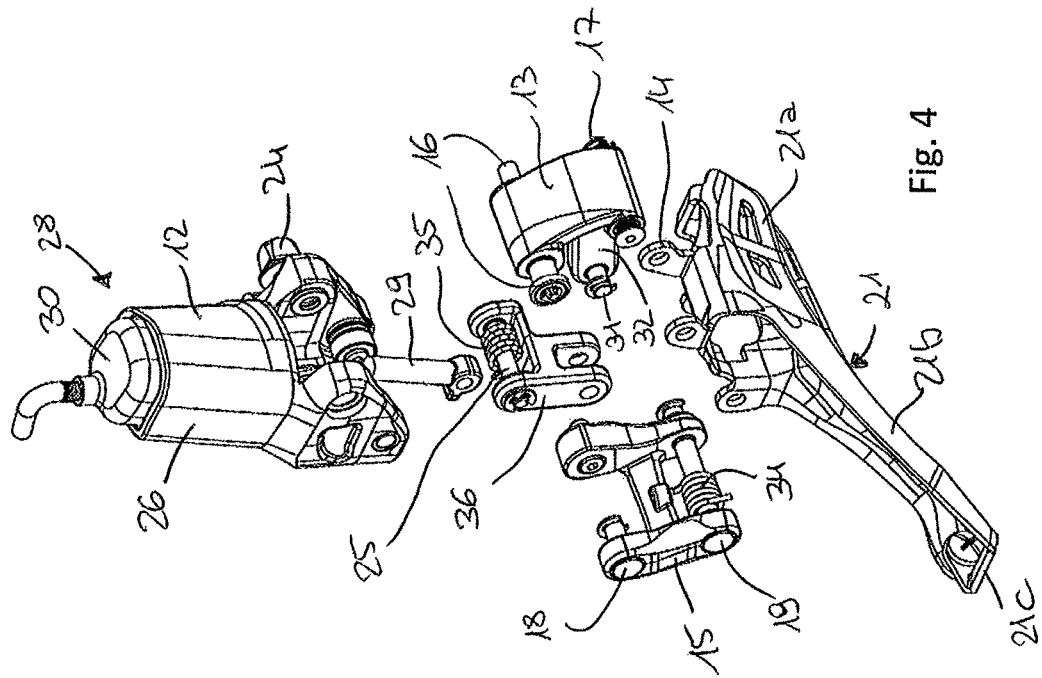
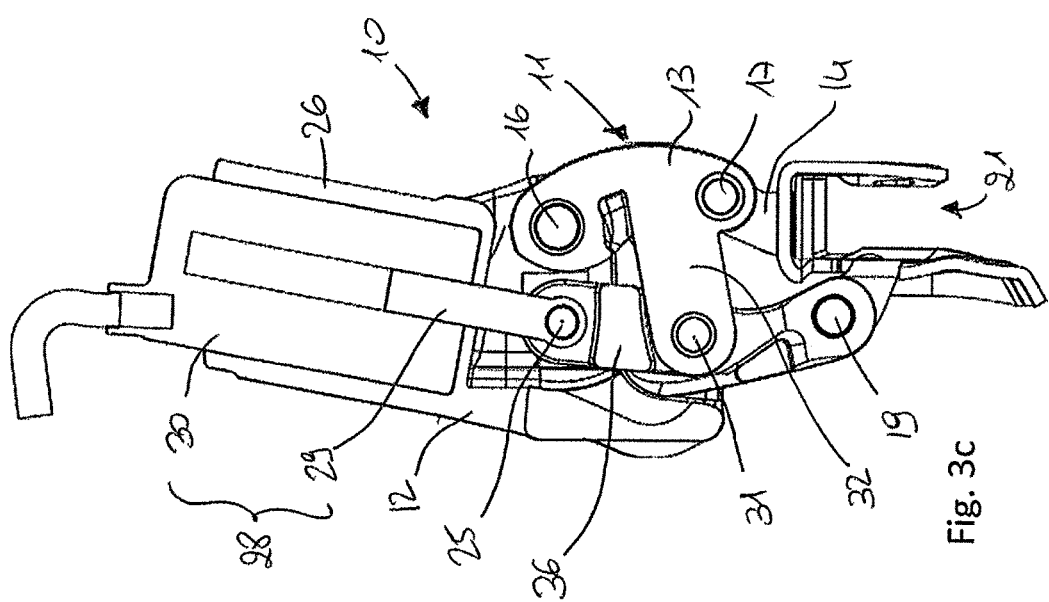

BICYCLE DERAILLEUR GEAR, PARTICULARLY A FRONT DERAILLEUR GEAR, WITH IMPROVED RELIABILITY

CROSS REFERENCE TO RELATED APPLICATION

This application claims the benefit of Italian Application No. MI2013A000299, which was filed on Feb. 28, 2013, and is incorporated herein by reference as if fully set forth.

FIELD OF INVENTION

The present invention relates to a bicycle derailleur gear, particularly a front derailleur gear, with improved reliability.

BACKGROUND

In the jargon of the specific field, under bicycle derailleur gear a front bicycle gearshift is meant. Therefore, in the context of this description, under the term bicycle derailleur gear a front bicycle gearshift will be meant.

Under bicycle derailleur gear a mechanical device is meant that causes the displacement of the transmission chain between different toothed wheels or crowns, for this purpose moving a chain guide in which the chain is engaged. Specifically, the derailleur gear moves the transmission chain between the different crowns associated with the pedal cranks.

Normally, the bicycle derailleur gear comprises a kinematic mechanism in the form of a four-bar linkage with a base body and a mobile body opposite the base body in the four-bar linkage, connected together through a pair of connecting rods hinged to such bodies according to four hinging axes through four pin elements, in which the base body is fixed to the bicycle frame and the mobile body is fixed to a chain guide. The deformation of the four-bar linkage therefore determines a displacement of the chain guide with respect to the frame in the axial direction with respect to the crowns and, in this way, gearshifting.

Relatively recently there has been increasingly common use of bicycle derailleur gears with motorized actuation, i.e. derailleur gears in which, as an alternative to conventional manual actuation, the deformation of the four-bar linkage is obtained through a motor member that is suitably controlled, typically electrically, which moves different parts of the four-bar linkage with respect to one another, deforming it and thus moving the chain guide.

In the development of these derailleur gears, a great detail of attention has been given to the quality of actuation, meaning the ability of the derailleur gear to carry out gearshifting quickly, precisely and reliably over time, at least as well as a conventional derailleur gear with manual actuation.

This requirement is obviously more important the more the derailleur gear is intended to be used in high-level cycling competitions.

In known bicycle front derailleur gears there is generally a toothed sector meshed together with the shaft of the motor member. The toothed sector is made on a lever constrained to the pin element shared by the base body and the first connecting rod in order to transfer to the first connecting rod a rotation about such a pin element controlled by a rotation of the threaded motor shaft.

The Applicant has realised that such a meshed coupling can be subject to malfunctions or create control imprecisions, since it is inevitably exposed to accumulation of residues or dirt during the normal use of the bicycle on the road or, even more so, off-road.

In extreme cases, the meshed coupling is subject to locking or in any case the dirt accumulated in the meshing exerts a contrast action with respect to the action applied by the motor member, introducing delays or imprecisions in the response to the command imparted by the cyclist, a circumstance that can lead to tarnishing the perception of performance that the cyclist has of derailleur gears with motorized actuation with respect to those with manual actuation.

The problem forming the basis of the invention is therefore to avoid the aforementioned drawbacks, in particular by providing a bicycle derailleur gear, particularly a front derailleur gear, which is able to offer and maintain over time excellent performance of control in terms of both precision and response times.

More specifically, the problem forming the basis of the present invention is that of making a bicycle derailleur gear that ensures that the performance of actuation control of the derailleur gear do not deteriorate over time due to dirt or possible residues that accumulate in the motion transfer interfaces between the motor member and the four-bar linkage-kinematic mechanism.

SUMMARY OF THE INVENTION

The present invention provides for a bicycle derailleur gear comprising a kinematic mechanism in the form of a four-bar linkage with a base body and a mobile body connected together through a pair of connecting rods hinged to the base body and to the mobile body at four pin elements, the mobile body carrying a chain guide, the four-bar linkage-kinematic mechanism being associated with derailleur gear actuation means suitable for deforming the four-bar linkage-kinematic mechanism so as to determine a displacement of the mobile body with respect to the base body and consequently a displacement of the chain guide, the derailleur gear actuation means being of the motorized type and comprising a motor casing and an outlet shaft that projects directly from the motor casing, characterised in that the actuation means command a translation in the axial direction of the outlet shaft with respect to the motor casing and are mounted between distinct components of the four-bar linkage-kinematic mechanism through interposition of at least one tilting interface about a fifth pin element substantially parallel to the four pin elements.

The Applicant has found that such a derailleur gear, during use, provides better precision and reliability over time, since the possible presence of dirt on the outlet shaft of the motor does not hamper either the movements thereof, and even less so the transfer of motion to the four-bar linkage-kinematic mechanism: such a transfer takes place, indeed, by pushing/pulling following an axial translation of the shaft, wherein the additional tilting interface allows the translation movement to be transformed into a mutual rotation between the components of the four-bar linkage-kinematic mechanism.

On the other hand, there are no relative movements of elements meshed together, the typical situation in which the presence of dirt increases friction, possibly compromising the precision of operation or, in extreme cases, determining locking up of the gears.

This embodiment of the bicycle derailleur gear can be further improved through the following additional features that can be combined with one another as desired.

In accordance with a preferred embodiment of the present invention, the actuation means are arranged between the base body and a connecting rod of the pair of connecting rods, wherein the translation in the axial direction of the outlet shaft determines a mutual rotation between the base body and the connecting rod about the pin element arranged between such components.

In this way a solution is obtained that is particularly simple in structural terms to reliably correlate the translation of the outlet shaft to the deformation of the four-bar linkage-kinematic mechanism by acting in particular on the two most easily accessible components of the four-bar linkage.

The actuation means can comprise a motor element capable of directly producing the translation movement of the outlet shaft. Preferably, however, the actuation means comprise a rotary motor element.

According to a first variant, the rotary motor element is provided with a primary outlet shaft associated with a transmission kinematically arranged between the primary motor shaft and the outlet shaft in order to determine the translation in the axial direction of the outlet shaft, wherein the rotary motor element, the primary motor shaft and the transmission are enclosed in the motor casing.

The fact that the motor element, its primary motor shaft and the transmission (which transforms the rotary motion of the motor element into the linear motion of the outlet shaft) are completely enclosed in the casing ensures protection of such parts—in general meshed together—from the possible deposit of dirt.

According to a further variant using a rotary motor element, the primary motor shaft is threaded and is coupled with the outlet shaft that, in the specific case of this embodiment, is shaped like an internally counterthreaded hollow bush, wherein the primary motor shaft and the meshing interface thereof with the outlet shaft are completely enclosed in the motor casing to ensure protection of such parts.

According to another variant in which a rotary motor element is used, the outlet shaft is threaded and is in geared coupling with a nut screw, wherein the rotary motor element and the nut screw are completely enclosed in the motor casing in order to prevent infiltrations of dirt or residues in the meshing interface between the outlet shaft and the nut screw.

Such solutions, as well as ensuring effective protection from the accumulation of dirt or residues, all allow a rotary motor element to be used, which can for example be electric, appreciated for its simplicity, reliability and low cost.

Preferably, the outlet shaft is immobile in rotation with respect to the motor casing. In this way, a free end of the outlet shaft can be directly connected to the connecting rod, for example rotatably about a sixth pin element substantially parallel to the pin elements of the four-bar linkage.

Advantageously, this embodiment ensures that both the pushing and the pulling exerted by the outlet shaft are transferred to the connecting rod, therefore avoiding the need for special repositioning means of the four-bar linkage-kinematic mechanism into an initial configuration, like for example a return spring.

According to a particularly advantageous embodiment of the present invention, the tilting interface comprises a support shell of the motor casing constrained in a tilting manner to the base body at the fifth pin element.

For this purpose, the fifth pin element is preferably made up of two half-pins that engage so as to rotate freely in two opposite seats of the support shell.

Such an embodiment is particularly versatile and reliable, since it allows the outlet shaft to act directly on the connecting rod and keep the inclination with respect to it that is most suitable for the transfer of motion.

Alternatively, the at least one tilting interface is arranged between a free end of the outlet shaft and the connecting rod.

In a preferred embodiment of such an alternative, the at least one tilting interface comprises an intermediate articulation element hinged to the free end of the outlet shaft at the fifth pin element and to the connecting rod at a sixth pin element.

Such an embodiment is particularly strong, since the support shell of the motor casing can be made in one piece with the base body able to be constrained to the frame. In this way the motor members contained in the casing are prevented from being subjected to excessive stress.

Moreover, the presence of an intermediate articulation element makes it possible to house an additional clearance recovery spring with respect to the clearance recovery spring generally present in the four-bar linkage-kinematic mechanism.

Preferably, the additional clearance recovery spring is located between the outlet shaft and the intermediate articulation element.

Such a clearance recovery spring is mounted and preloaded so as to work in antagonism to the other clearance recovery spring giving the system greater elasticity and recovery capability.

Even more preferably, the sixth pin element is made on an actuation arm of the connecting rod, fixedly connected to it.

There is therefore the possibility of transferring to the connecting rod the action of the outlet shaft of the derailleur gear actuation means in a direct and reliable manner.

BRIEF DESCRIPTION OF THE DRAWINGS

Further features and advantages of the present invention will become clearer from the following detailed description of some preferred embodiments thereof, made with reference to the attached drawings. The different features in the single configurations can be combined with one another as desired according to the above description, should it be necessary to have the advantages resulting specifically from a particular combination.

In such drawings:

FIGS. 2a, 2b and 2c are, respectively, a perspective view in mounted configuration, in exploded configuration and a section view along the line A-A of FIG. 2a of a first embodiment of the bicycle derailleur gear according to the present invention;

FIGS. 3a, 3b and 3c are, respectively, a perspective view in mounted configuration, in exploded configuration and a section view along the line B-B of FIG. 3a of a second embodiment of the bicycle derailleur gear according to the present invention;

FIG. 4 is an exploded perspective view of a third embodiment of the bicycle derailleur gear according to the present invention.

DETAILED DESCRIPTION OF THE PREFERRED EMBODIMENT(S)

Figure 2A:
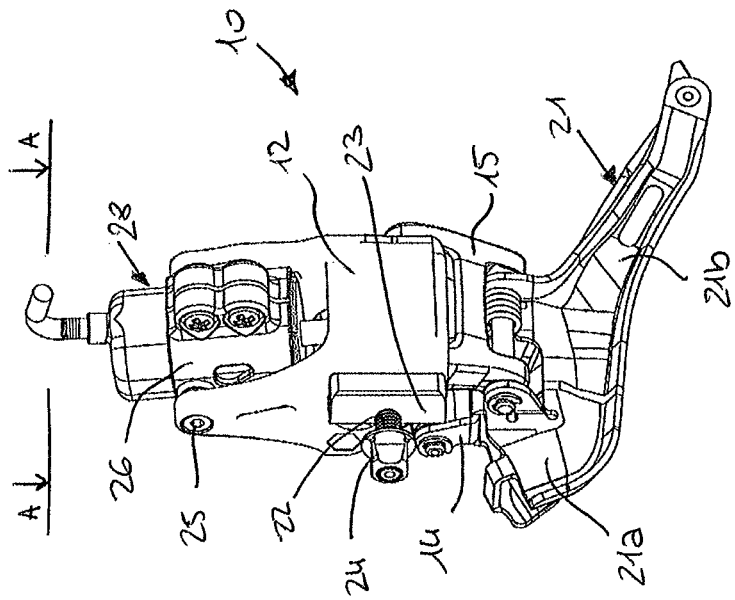

In the following description, in order to illustrate the figures identical reference numerals are used to indicate constructive elements with the same function.

With reference to the figures, a bicycle derailleur gear is shown, wholly indicated with 10.

The bicycle derailleur gear 10 being referred to is a bicycle front gearshift that moves a closed-loop transmission chain (not illustrated) between a plurality of toothed wheels 33 associated with the pedal cranks 37 of a bicycle 100.

The bicycle derailleur gear 10 comprises a kinematic mechanism in the form of a four-bar linkage 11 with a base body 12 and a mobile body 14 connected together through a pair of connecting rods 13,15 a first connecting rod 13 of which is hinged to the base body 12 at a first hinging axis through a first pin element 16 and to the mobile body 14 at a second hinging axis through a second pin element 17, whereas a second connecting rod 15 is hinged to the base body 12 at a third hinging axis through a third pin element 18 and to the mobile body 14 at a fourth hinging axis through a fourth pin element 19.

Preferably, the second connecting rod 15 is the one facing towards the frame 20 of the bicycle 100 and, consequently, indicated as inner connecting rod. Correspondingly, the first connecting rod 13 corresponds to the outer connecting rod, opposite the inner connecting rod 15.

The base body 12 is intended to be fixed to a frame 20 of the bicycle 100.

The mobile body 14, opposite the base body 12 in the four-bar linkage 11, carries a chain guide 21 that, in the illustrated embodiments, is made in one piece with it.

In alternative embodiments that are not illustrated, the mobile body 14 and the chain guide 21 are made as separate elements constrained together in a fixedly connected manner.

The chain guide 21 consists of a hollow body 21a that is open at the bottom and is provided with two arms 21b that extend parallel towards a first end 21c of the chain guide 21 to join together at such a first end 21c. In this way, the transmission chain is allowed to pass without interference when it is engaged with a toothed wheel 33 and to be engaged in a supported and lifted fashion during gearshifting.

Figure 1:
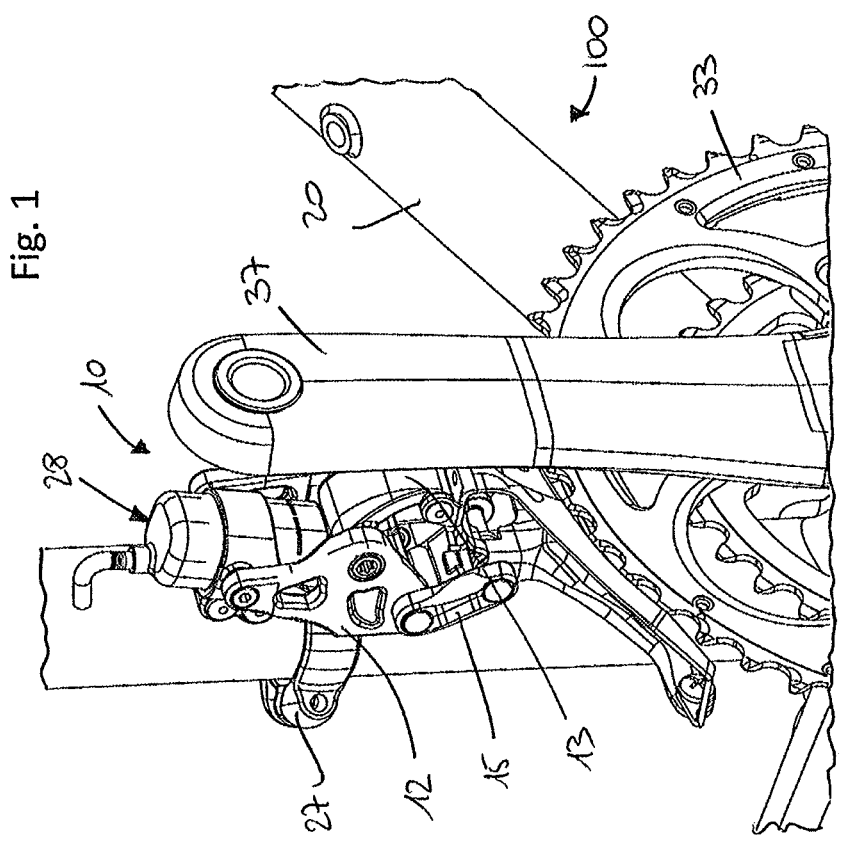
FIG. 1 shows a bicycle derailleur gear according to the present invention associated with a bicycle frame and with the toothed wheels.

The base body 12 is preferably connected to the frame 20, directly or through interposition of a strap 27 as shown in FIG. 1, through the use of a screwed coupling. For this purpose, the base body 12 comprises a shaped portion 23 for resting on the frame 20 from which projects a threaded screw 22 able to be fastened to the frame 20 through a suitable nut 24.

In the four-bar linkage-kinematic mechanism 10 there is preferably a first clearance recovery spring 34.

Preferably, the first clearance recovery spring 34 is arranged between the mobile body 14 and a connecting rod 13,15 of the pair of connecting rods 13,15.

A first end of the first clearance recovery spring 34 fastens to such a connecting rod 13,15 and the other end of the first clearance recovery spring 34 fastens to the mobile body 14.

The first clearance recovery spring 34 exerts a force between the connecting rod 13,15 on which it acts and the mobile body 14 so as to recover possible clearances between the two components and, more generally, possible clearances of the four-bar linkage-kinematic mechanism 11.

In the illustrated embodiments, the first clearance recovery spring 34 is arranged between the mobile body 14 and the second connecting rod 15 or inner connecting rod of the pair of connecting rods 13,15.

Derailleur gear actuation means 28 are also provided, associated with the four-bar linkage-kinematic mechanism 11 so as to deform it and thus determine a relative displacement between the mobile body 14 and the base body 12 and, consequently, a displacement of the chain guide 21 with respect to the frame 20.

The actuation means 28 are of the motorized type and comprise a motor casing 30 and an outlet shaft 29 that projects directly from the motor casing 30.

According to the present invention, the actuation means 28 command a translation in the axial direction of the outlet shaft 29 with respect to the motor casing 30 and are mounted between distinct components 12,13,14,15 of the four-bar linkage-kinematic mechanism 11 through interposition of at least one tilting interface 26,36 about a fifth pin element 25 substantially parallel to the four pin elements 16,17,18,19 of the four-bar linkage-kinematic mechanism 11.

In this way, a translation in the axial direction of the outlet shaft 29 is able to determine a mutual rotation between the components 12,13,14,15 of the four-bar linkage-kinematic mechanism 11.

Preferably, the actuation means 28 of the derailleur gear are arranged between the base body 12 and a connecting rod 13,15 of the pair of connecting rods 13,15 to impose a mutual rotation of such components 12 and 13,15 about the respective pin element 16,18 that connects them.

In the illustrated embodiments, the actuation means 28 are arranged between the base body 12 and the first connecting rod 13 or outer connecting rod 13. In a totally equivalent way, however, it is possible to provide for the actuation means 28 to be arranged between the base body 12 and the inner connecting rod 15.

In order to command a translation in the axial direction of the outlet shaft 29, the actuation means 28 comprise a motor element (not depicted) capable of directly producing a translating displacement of the outlet shaft 29 or, alternatively, of the rotary type.

In this second case, the actuation means 28 can be made in different ways.

According to a first embodiment (not illustrated), a primary outlet shaft of the rotary motor element is set in rotation by such a motor element and activates a transmission kinematically arranged between the primary motor shaft and the outlet shaft 29 in order to determine a translation in the axial direction of the latter, wherein the rotary motor element, the primary motor shaft and the transmission are completely enclosed in the motor casing 30 in order to prevent infiltrations of dirt or residues.

The transmission can be made in various ways. In accordance with a preferred alternative, the structural details of which are not however illustrated in the figures, the transmission comprises a secondary motor shaft, a train of rotation reduction gears arranged between the primary motor shaft and the secondary motor shaft, and a pinion mounted so as to rotate as a unit on the secondary motor shaft engaged with a rack formed on the outlet shaft 29.

According to a further embodiment of the actuation means 28 (also not represented in the figures), the primary motor shaft is threaded and is coupled with the outlet shaft 29 that, in the specific case of this embodiment, is shaped like an internally counterthreaded hollow bush. In this way, a mutual rotation between the primary motor shaft and the outlet shaft 29 determines a relative sliding between the two shafts and therefore a pure translation of the outlet shaft 29 with respect to the motor casing 30.

In such a solution, the primary motor shaft and the meshing interface thereof with the outlet shaft 29 are completely enclosed in the motor casing 30 in order to avoid an accumulation of dirt at the meshing.

According to another embodiment, also not illustrated in the figures, the outlet shaft is threaded and is in meshed coupling with the nut screw, wherein the rotary motor element and the nut screw are completely enclosed in the motor casing 30 in order to prevent infiltrations of dirt or residues in the meshing interface between the outlet shaft 29 and the nut screw. In this way a mutual rotation between the outlet shaft 29 and the nut screw additionally determines a sliding of the outlet shaft 29 towards the outside of the motor casing 30.

In the first embodiment illustrated in FIGS. 2a, 2b and 2c, the free end of the outlet shaft 29 is configured like a loop and is directly connected to the connecting rod 13,15 with the possibility of mutual rotation about a sixth pin element 31 also parallel to the pin elements 16,17,18,19. The outlet shaft 29 does therefore not rotate with respect to the motor casing 30.

The sixth pin element 31 is made on an actuation arm 32 of the connecting rod 13,15 shaped like a portion fixedly connected to the connecting rod 13,15 and projecting from it 13,15 towards the inside of the four-bar linkage-kinematic mechanism 11.

In this embodiment, the tilting interface is made in the form of a support shell 26 of the motor casing 30 and is hinged to the base body 12. For this purpose, the fifth pin element 25 is made up of two half-pins 25a that engage so as to rotate freely in two opposite seats 25b of the support shell 26.

The second and third embodiment, respectively illustrated in FIGS. 3a, 3b, 3c and 4, differently provides for the tilting interface to be arranged between the free end of the outlet shaft 29 and the connecting rod 13,15 on which such a shaft 29 acts.

In such embodiments, the tilting interface is made in the form of intermediate articulation element 36.

The intermediate articulation element 36 is hinged, on one side, to the free end of the outlet shaft 29 so that a push/pull exerted by the outlet shaft 29 on such an intermediate articulation element 36 determines a rotation thereof about the fifth pin element 25.

The free end of the outlet shaft 29 is preferably shaped like a loop and engages with the fifth pin element 25 arranged at a first end of the intermediate articulation element 36. Also in this case therefore, the outlet shaft 29 does not rotate with respect to the motor casing 30.

The second end of the intermediate articulation element 36 is hinged to the connecting rod 13,15 so as to allow a mutual rotation between such a connecting rod 13,15 and the intermediate articulation element 36 about the sixth pin element 31 that, similarly to what has already been outlined in relation to the first embodiment, is made on the actuation arm 32 of the connecting rod 13,15.

In the second and third embodiments, the support shell 26 of the motor casing 30 is made fixedly connected to the base body 12.

In particular, the third preferred embodiment illustrated in FIG. 4 additionally provides for a second clearance recovery spring 35 arranged between the outlet shaft 29 of the motor casing 30 and the intermediate articulation element 36. A first end of the second clearance recovery spring 35 fastens to the outlet shaft 29 and the other end of the second clearance recovery spring 35 fastens to the intermediate articulation element 36.

The second clearance recovery spring 35 is mounted and pre-loaded so as to work in antagonism to the first clearance recovery spring 34. Specifically, a deformation of the four-bar linkage-kinematic mechanism 11 respectively determines a greater load of the first spring 34 and a smaller load of the second spring 35 or vice-versa.

The operation of the bicycle derailleur gear 10 according to the invention is as follows.

An activation of the derailleur gear actuation means 28 by the cyclist determines a lengthening/shortening of the portion of outlet shaft that projects from the motor casing 30.

According to the particular embodiment, the end of the outlet shaft 29 acts directly or indirectly on one of the connecting rods 13,15, exerting a pushing/pulling action on the actuation arm 32 which in turn sets the connecting rod 13,15 with which it is associated in rotation. In this way there is a deformation of the four-bar linkage-kinematic mechanism 11.

In case the end of the outlet shaft 29 only rests on the actuation arm 32 and is not constrained to it, such a shaft 29 is able to exert only a thrusting action. Therefore, the return into position of the four-bar linkage-kinematic mechanism 11 is obtained through suitable return means, like for example a spring (not illustrated).

From the description that has been made, the features of the bicycle derailleur gear according to the present invention are clear, just as the relative advantages are also clear.

The bicycle derailleur gear according to the present invention is indeed able to maintain over time the command performance in terms both of precision and of response times since the parts at risk of an alteration in friction due to the presence of dirt are either totally absent or enclosed in a protected manner inside a closed casing.

Further variants of the embodiments described above are possible, without departing from the teaching of the invention.

Indeed, it is possible to foresee for the outlet shaft to be just of the translating or rototranslating type according to the requirements of implementation.

Moreover, the derailleur gear actuation means can be of a different type or arranged so as to act between different components of the four-bar linkage-kinematic mechanism with respect to those illustrated in the preferred but not limiting embodiments discussed.

Finally, it is clear that the bicycle derailleur gear thus conceived can undergo numerous modifications and variants, all of which are covered by the invention; moreover, all of the details can be replaced by technically equivalent elements. In practice, the materials used, as well as the sizes, can be whatever according to the technical requirements.

What is claimed is:

1. Bicycle derailleur gear comprising a kinematic mechanism in the form of a four-bar linkage with a base body and a mobile body connected together through a pair of connecting rods hinged to said base body and to said mobile body at four pin elements, said mobile body carrying a chain guide, said four-bar linkage-kinematic mechanism being associated with derailleur gear actuation means suitable for deforming said four-bar linkage-kinematic mechanism so as to determine a displacement of said mobile body with respect to said base body and consequently a displacement of said chain guide, said derailleur gear actuation means being of the motorised type and comprising a motor casing and an outlet shaft that projects directly from said motor casing, wherein said actuation means command a translation in the axial direction of said outlet shaft within said motor casing; and said actuation means are mounted between distinct components of said four-bar linkage-kinematic mechanism through interposition of at least one tilting interface about a fifth pin element substantially parallel to said pin elements.

2. Bicycle derailleur gear according to claim 1, wherein said actuation means are arranged between said base body and a connecting rod of said pair of connecting rods, said translation in the axial direction of said outlet shaft determining a mutual rotation between said base body and said connecting rod about a pin element of said four pin elements arranged between said base body and said connecting rod.

3. Bicycle derailleur gear according to claim 1, wherein said actuation means comprise a motor element capable of directly producing a translating displacement of said outlet shaft.

4. Bicycle derailleur gear according to claim 1, wherein said actuation means comprise a motor element of the rotary type provided with a primary outlet shaft associated with a transmission kinematically arranged between said primary motor shaft and said outlet shaft in order to determine said translation in the axial direction of said outlet shaft, said rotary motor element, said primary motor shaft and said transmission being enclosed in said motor casing.

5. Bicycle derailleur gear according to claim 1, wherein said outlet shaft is immobile in rotation with respect to said motor casing.

6. Bicycle derailleur gear according to claim 5, wherein a free end of said outlet shaft is connected to said connecting rod in a rotary manner about a sixth pin element substantially parallel to said pin elements.

7. Bicycle derailleur gear according to claim 1, wherein said at least one tilting interface comprises a support shell of said motor casing constrained in a tilting manner to said base body at said fifth pin element.

8. Bicycle derailleur gear according to claim 1, wherein said at least one tilting interface is arranged between a free end of said outlet shaft and said connecting rod.

9. Bicycle derailleur gear according to claim 8, wherein said at least one tilting interface comprises an intermediate articulation element hinged to said free end of said outlet shaft at said fifth pin element and to said connecting rod at a sixth pin element.

10. Bicycle derailleur gear according to claim 6, wherein said sixth pin element is made on an actuation arm of said connecting rod fixedly connected to it.

11. Bicycle derailleur gear according to claim 9, wherein between said outlet shaft and said intermediate articulation element a clearance recovery spring is arranged.

* * * * *